Dec. 29, 1925.
F. A. MITCHELL
BABY CARRIER
Filed Dec. 11, 1924　　2 Sheets-Sheet 1
1,567,285
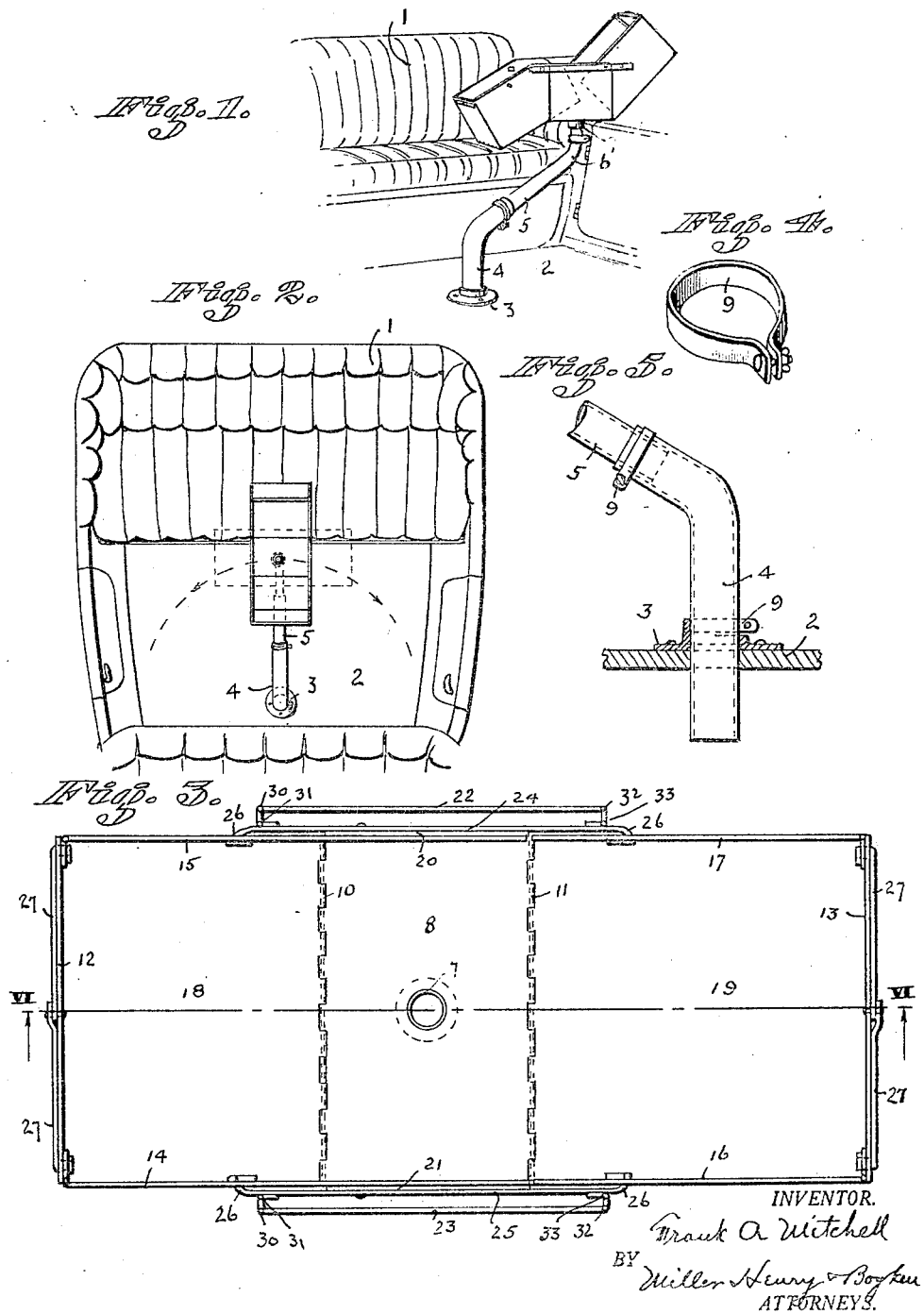
INVENTOR.
Frank A. Mitchell
BY
Miller Henry & Boyken
ATTORNEYS.

Dec. 29, 1925.
F. A. MITCHELL
BABY CARRIER
Filed Dec. 11, 1924
1,567,285
2 Sheets-Sheet 2
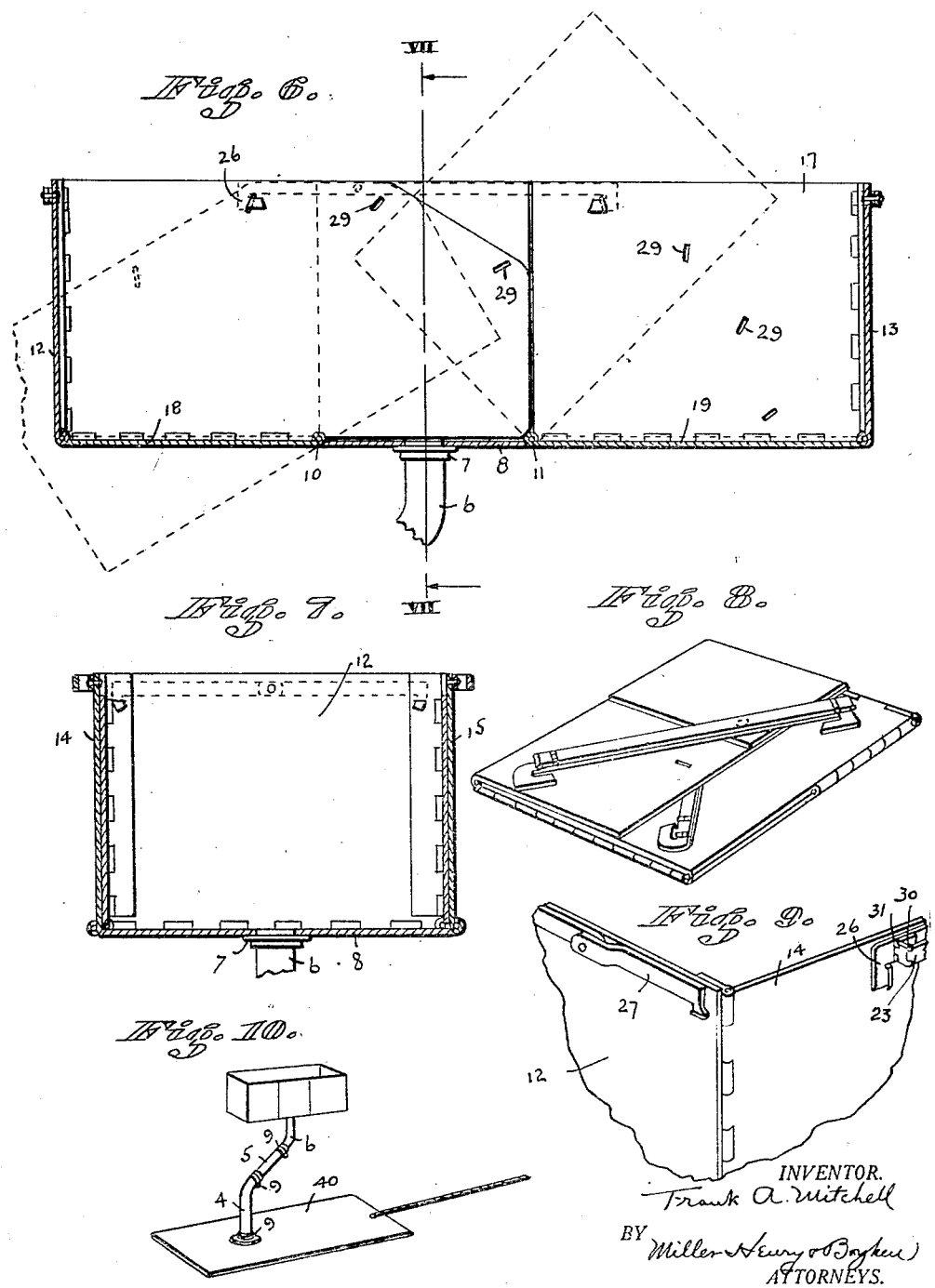
INVENTOR.
Frank A. Mitchell
BY
Miller Henry & Boykin
ATTORNEYS.

Patented Dec. 29, 1925.

1,567,285

UNITED STATES PATENT OFFICE.

FRANK A. MITCHELL, OF SAN FRANCISCO, CALIFORNIA.

BABY CARRIER.

Application filed December 11, 1924. Serial No. 755,294.

*To all whom it may concern:*

Be it known that I, FRANK A. MITCHELL, citizen of the United States, residing at San Francisco, county of San Francisco, State of California, have invented new and useful Improvements in Baby Carriers, of which the following is a specification.

My invention has for its object means and mechanism for supporting a baby and is particularly adapted to the use of automobiles.

A further object of the invention is a device of the character described which is adjustable as to height and lateral movement and which when adjusted to the desired position may be clamped to prevent displacement during the movement of the vehicle.

A further object is a device of the character described which is adjustable to suit varying positions of the child.

A further object is a device of the character described which may be folded into collapsed form for storage under the seat of the vehicle or may be easily and readily carried about in its collapsed form.

A further object is a device of the character described which may be readily lifted from its normal support with the child therein.

Other objects will appear from the drawings and specifications which follow.

Referring to the drawings.

By referring to the drawing and specification which illustrate my invention in one of its forms, the construction and operation will be made clear.

Fig. 1 is a perspective view of one form of the device of my invention in one of its adjusted positions in the tonneau portion of an automobile.

Fig. 2 is a plan view of the tonneau portion of an automobile with the device in another adjusted position.

Fig. 3 is an enlarged plan view of the carrier compartment in outfolded position corresponding with a reclining position of the child.

Fig. 4 is a detail of one form of the clamp member employed in the adjustment.

Fig. 5 is a fragmentary detail showing a portion of a vehicle floor with a standard for supporting the compartment of Fig. 3 in position therein.

Fig. 6 is a section of Fig. 3 on the line VI—VI thereof.

Fig. 7 is a cross section of Fig. 6 on the line VII—VII thereof.

Fig. 8 is a perspective view of the compartment member in its collapsed or folded position.

Fig. 9 is a fragmentary detail of one of the corner members showing the locking portions.

Fig. 10 is a reduced perspective drawing of the device, provided with a special base for nursery or household use.

Throughout the figures similar numerals refer to identical parts.

The numeral 1 indicates the seat of any conventional automobile or vehicle, the remaining portions in the vehicle not being shown, but well-known.

The floor of the vehicle is shown at 2, and fitted thereto is a flange member 3, into which telescopes the standard 4, having adjustable telescopic intermediate member 5 and end member 6. The end of member 6 engages the flange 7 preferably by screw threads or other conventional means, the said flange being preferably fixed as a portion of the container base 8. Clamping means of any type, one of which is best shown at 9, Fig. 4 are employed to clamp the several portions of the standard together in any of the adjusted positions.

The container is preferably formed of three sections each having sides and bottom portions, the two outer sections being hinged at 10 and 11 respectively to the base 8 and having ends 12, 13 and sides 14, 15 and 16, 17 respectively. The end sections have base members 18, 19 being continuations of the central base portion 8 and joined thereto with hinge joints 10, 11 respectively.

The end and sides 14, 12, and 15 are hinged to the base portion 18 along their intersection, while the end 13 and sides 17, 16 are similarly joined to the base member 19.

The central portion has side segments 20, 21 hinged to the bottom member 8 and there overlap the sides 15, 17 and 14, 16 respectively.

Extending laterally from the sides 20, 21 are the handle bars 22, 23, preferably hinged at their corners to the locking bars 24, 25. These locking bars have end tongues 26, and the overlapping portions of the sides 15, 20 and 14, 21, have a plurality of cooperative slots 29, arranged on a common radius from the hinge 10, any two of which may be locked together by the tongue 26, thus allowing the corresponding end member to be moved and locked in any adjusted position.

Similar slots 29, are arranged to register between sides 20 and 17 and sides 21, 16, enabling the other end portion to be adjusted with respect to the central portion as desired and when the end portions are so adjusted the locking bars 24, 25 retain the several parts of the container in their adjusted positions. Two of the adjusted positions are shown in Figs. 1 and 10.

The end walls 12, 13, may be locked with the sides 14, 15, and 16, 17, respectively by swinging bolt members 27, having cooperating tongues and slots similar to those above described.

The handle bars 22, 23, are preferably hinged at 30, 31, 32, 33, so that they may be collapsed from the position shown in Fig. 3 to that shown in Fig. 8 when the parts are folded together.

At 40 is shown a floor board or base adapted to receive the standard 4, when the device is removed from the vehicle and carried into the house by gripping the handle members 22, 23.

The operation is as follows:

The container in its folded condition, shown in Fig. 8 is outfolded as shown in Figs. 3, 6, 7, and the slots 29 brought into registration between the sides 15 and 20 in any of the desired adjusted positions, with the tongue end 26 of the locking bar 24, engaging therewith; tongue 26 of bar 25 then engages similar slots on the opposite side, and similar tongues and slots are locked together between the sides 17, 20 and 16, 21.

The end plates 12 and 13 are locked to the sides 15, 14 and 17, 16 by bolt members 27 and the container by the flange 7 is engaged with the standard 4, 5, 6, in such adjusted position as may best suit the convenience of the vehicle occupants. The clamps 9 are then tightened and the device locked in position.

The device is now ready to receive the baby as shown in Figs. 1 or 2 and may be lifted from the flange 3 and placed upon the floor board 40, Fig. 10 without disturbing the child. By manipulating the handle bars 22, 23, the adjustment of the sides or end portions may be varied so that the child may occupy a reclining or sitting up position, or any intermediate position desired, depending upon the particular registering slots 29 that are engaged by the tongues 26.

I claim:

1. A baby carrier comprising a container having a central portion and two end portions, each of said portions having sides and a base member said three base members hinged together, and the sides and base member of each portion hinged together, means for locking together the sides of adjacent portions, and a folding end plate on each end portion, all constructed and adapted to fold together into a flat package.

2. A device as set forth in claim 1 in combination with a standard and means adapted to attach said standard to a vehicle floor.

3. A device as set forth in claim 1 in combination with a standard having telescoping parts adjustable as to length and height and means adapted to attach said standard to a vehicle floor.

FRANK A. MITCHELL.